(12) United States Patent
Yang et al.

(10) Patent No.: US 10,132,255 B2
(45) Date of Patent: Nov. 20, 2018

(54) SYSTEM AND METHOD FOR VEHICLE ENGINE SPEED CONTROL DURING A GARAGE SHIFT

(71) Applicant: GM GLOBAL TECHNOLOGY OPERATIONS LLC, Detroit, MI (US)

(72) Inventors: Koon Chul Yang, Commerce Township, MI (US); You Seok Kou, Novi, MI (US)

(*) Notice: Subject to any disclaimer, the term of this patent is extended or adjusted under 35 U.S.C. 154(b) by 88 days.

(21) Appl. No.: 15/397,760

(22) Filed: Jan. 4, 2017

(65) Prior Publication Data

US 2018/0187618 A1  Jul. 5, 2018

(51) Int. Cl.
*F02D 41/02* (2006.01)
*F16H 63/50* (2006.01)

(52) U.S. Cl.
CPC ......... *F02D 41/0215* (2013.01); *F16H 63/50* (2013.01); *F02D 2200/101* (2013.01); *F02D 2400/12* (2013.01)

(58) Field of Classification Search
CPC ............. F02D 2400/12; F02D 41/0215; F02D 2200/101; F16H 63/50
See application file for complete search history.

(56) References Cited

U.S. PATENT DOCUMENTS

| | | | |
|---|---|---|---|
| 6,799,108 B2 | 9/2004 | Aldrich, III et al. | |
| 7,571,711 B2* | 8/2009 | Sato | F02D 9/02 123/350 |
| 8,566,002 B2* | 10/2013 | Livshiz | B60W 10/06 477/54 |
| 8,640,838 B2* | 2/2014 | Nagashima | F02D 37/02 192/3.21 |
| 9,090,244 B2 | 7/2015 | Dai et al. | |
| 9,701,299 B2* | 7/2017 | Horgan | B60W 10/06 |
| 2014/0357444 A1* | 12/2014 | Seo | F16H 37/027 475/198 |
| 2015/0239451 A1* | 8/2015 | Horgan | B60W 10/023 701/102 |

* cited by examiner

*Primary Examiner* — Hung Q Nguyen
*Assistant Examiner* — Mark L Greene

(57) ABSTRACT

A method and system for controlling vehicle engine speed during a garage shift includes determining a K-factor of a torque converter based upon a speed ratio of the torque converter, normalizing the K-factor, and controlling an engine speed based upon the normalized K-factor.

2 Claims, 5 Drawing Sheets

SYSTEM AND METHOD FOR VEHICLE ENGINE SPEED CONTROL DURING A GARAGE SHIFT

FIELD

The present disclosure relates to a system and method for vehicle engine speed control during a garage shift.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

A vehicle may include a propulsion system with a prime mover, such as, an internal combustion engine, an electric motor, or the like, a transmission and a torque converter mechanically coupled between the prime mover and the transmission. The torque converter may include a turbine and an impeller. The impeller is mechanically coupled to the prime mover and rotates together with an output shaft of the prime mover (i.e. at an engine speed). A fluid coupling connects the turbine to the impeller and the turbine is mechanically coupled to the transmission.

FIG. 1 graphically illustrates an engine speed control during a garage shift. A garage shift is generally defined as a transmission shift from a non-drive transmission mode, such as park or neutral, to a drive transmission mode, such as drive or reverse. While in a non-drive transmission mode the turbine rotates freely and substantially at the same speed as the engine. However, when placed into a drive transmission mode while the vehicle is not moving, the transmission does not rotate and, as a result, the turbine does not rotate. This transition between the rotating to non-rotating condition causes the fluid coupling to apply a torque to the impeller which is transmitted to the engine. In the absence of proper correction, the engine speed may fluctuate in response. For example, the engine speed may be reduced. Such engine speed fluctuations may be undesirable.

FIG. 1 is a graphical illustration of a conventional engine speed control 100 during a garage shift. FIG. 1 illustrates a desired engine speed at 102 and actual engine speed at 104. Preferably, the engine speed 104 closely follows the desired engine speed 102. Generally, in a garage shift, the desired engine speed 102 will be constant as illustrated in FIG. 1.

As explained above, during a garage shift from a non-drive transmission mode to a drive transmission mode, since the vehicle is stationary, the turbine will transition from a rotating condition to substantially non-rotating condition. FIG. 1 illustrates turbine speed at 106 making that transition. In an attempt to control the engine speed 104 such that it preferentially follows closely to the desired engine speed 102, the torque request to the engine may be modified. FIG. 1 illustrates two different types of modifications.

A modification signal 108 may be generated in response to the change in turbine speed 106. This turbine speed modification signal 108 modifies the request for engine torque based upon the turbine speed 106. Another adjustment signal 110 modifies the request for engine torque based upon values in a table which reference engine speed error and vehicle speed. The table which is used to generate this signal 110 is manually calibrated and is thus referred to as a calibrated modification signal 110.

Neither the turbine speed modification signal 108 nor the calibrated modification signal 110 have been adequate to reliably avoid fluctuations in engine speed. In practice, while these methods may work some of the time, other times, they are not capable of adequately and reliably avoid engine speed fluctuations.

SUMMARY

In an exemplary aspect, a method for controlling a vehicle engine speed during a garage shift includes determining a K-factor of a torque converter and controlling an engine speed based upon the determined K-factor.

In another exemplary aspect, controlling the engine speed includes determining an engine torque compensation based upon the determined K-factor and controlling an engine torque based upon the determined engine torque compensation.

In another exemplary aspect, the engine torque compensation is based upon a square of a desired engine speed divided by the determined K-factor.

In another exemplary aspect, the method further includes determining a speed ratio for the torque converter and wherein the K-factor is determined based upon the determined speed ratio.

In another exemplary aspect, determining the speed ratio includes determining a turbine speed of the torque converter, detecting an engine speed, and dividing the turbine speed by the engine speed to determine the speed ratio.

In another exemplary aspect, determining a K-factor includes looking up a K-factor in a table based upon the speed ratio.

In another exemplary aspect, the method further includes normalizing the determined K-factor and wherein controlling the engine speed is based upon the normalized K-factor.

In another exemplary aspect, normalizing the determined K-factor is based upon the square of a K-factor corresponding to a speed ratio of zero divided by the square of a K-factor corresponding to the determined speed ratio.

In another exemplary aspect, the engine speed is further controlled based upon a desired engine speed.

In this manner, engine speed is reliably controlled to avoid undesirable engine fluctuations during a garage shift. Additionally, the manual work required to calibrate and generate the tables which may have conventionally been used is obviated. Therefore, the present disclosure is reduces workload.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
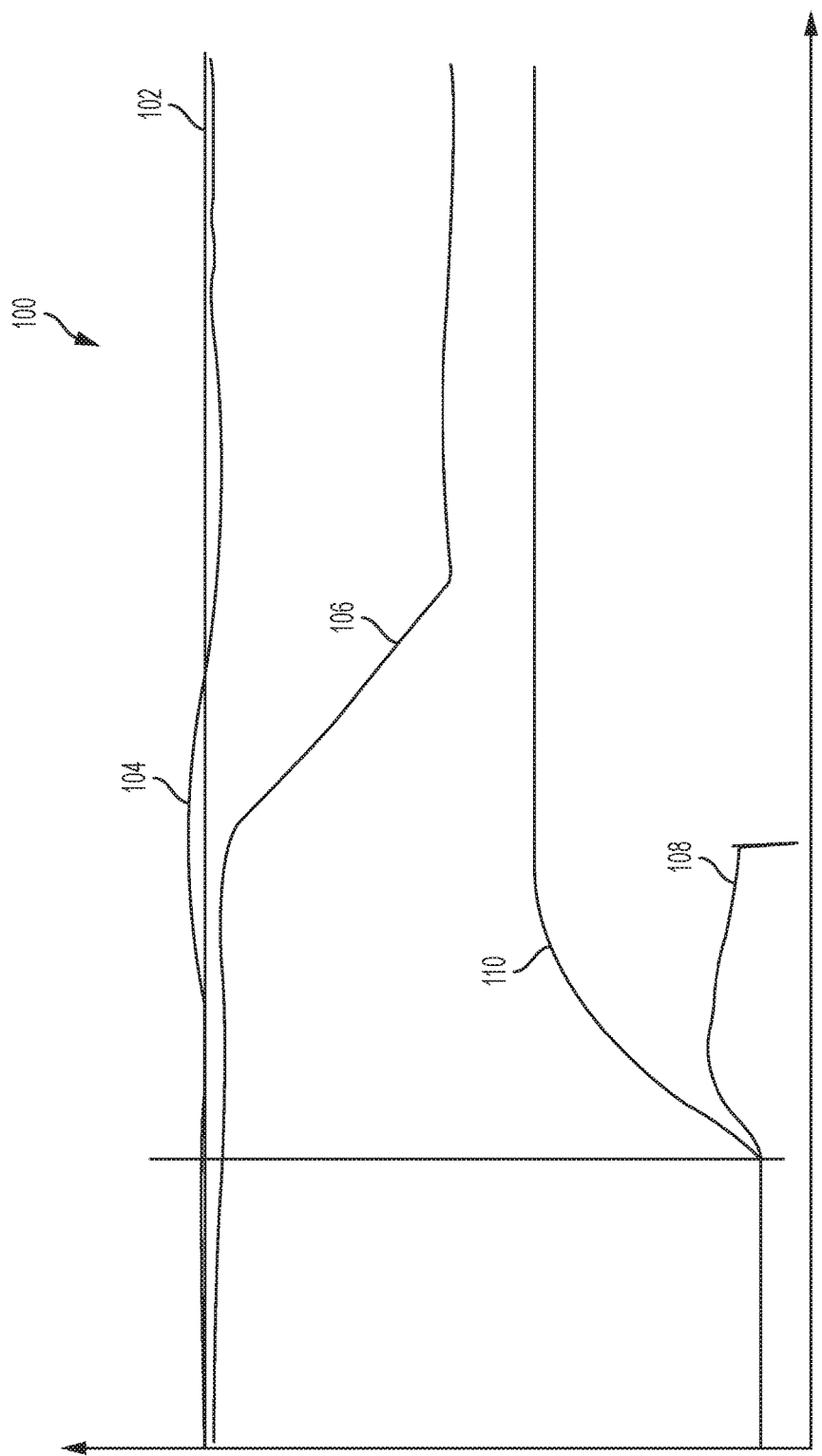
FIG. 1 is a graphical illustration of an engine speed control during a garage shift.
Figure 2:
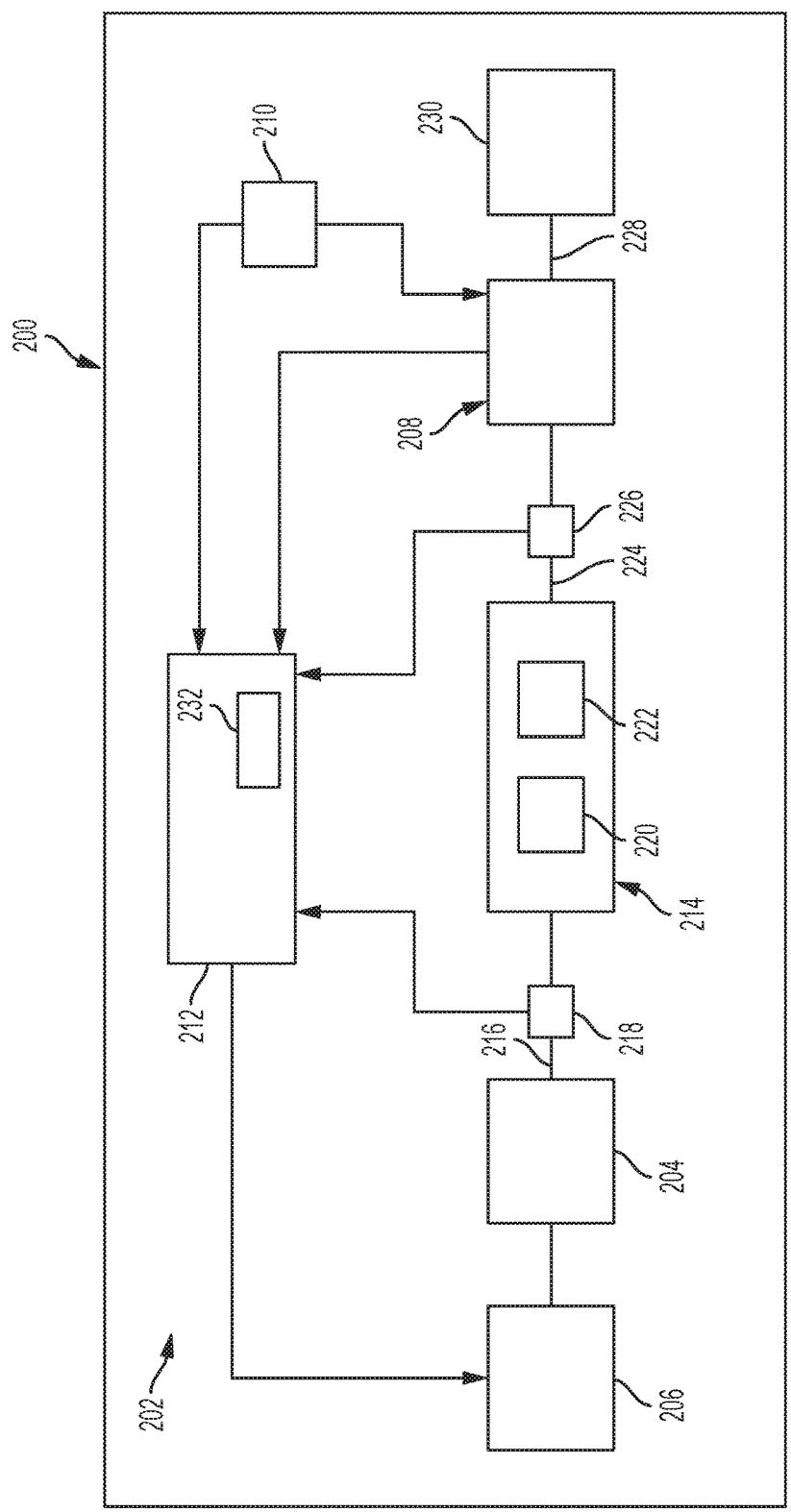
FIG. 2 is a schematic block diagram of a vehicle including a propulsion system.

FIG. 2 is a schematic block diagram of a vehicle 200 including a propulsion system 202. The propulsion system 202 includes a prime mover 204, such as, for example, an internal combustion engine, an electric motor, or the like without limitation. The propulsion system 202 also includes one or more actuators 206 configured to interact with and control the prime mover 204. For example, the actuators 206 may include, but are not limited to, throttles, spark plugs, fuel injection systems, and the like that may be regulated to control the operation of the prime mover 204.

The propulsion system 202 further includes a transmission 208 mechanically coupled to the prime mover 204. As such, the prime mover 204 is configured to supply power to the transmission 208. The transmission 208 may have one or more non-drive transmission states, such as park or neutral, and one or more drive transmission states, such as reverse or drive. The vehicle 200 further includes a transmission mode selector 210 in communication with the transmission 208. The transmission mode selector 210 can receive an input or request from a vehicle operator. For example, the vehicle operator may actuate the transmission mode selector 210 by moving it from one of the non-drive transmission positions, such as park or neutral, to one of the drive transmission positions, such as reverse or drive. Once it changes position, the transmission mode selector 210 may generate a mode selector signal indicative of the transmission mode position and send that signal to the transmission 208. In response to the mode selector signal, the transmission 208 may adjust to, for example, change gears or adjust drive ratios. A system controller 212 may be in communication with the transmission mode selector 210. As such, the system controller 212 may sense a vehicle operator request for transition from a non-drive transmission position to a drive transmission position.

The transmission 208 includes a transmission output shaft 228. The propulsion system 202 further includes a driveline 230 mechanically coupled to the transmission output shaft 228. The driveline 230 distributes the engine power to the vehicle wheels (not shown) to propel the vehicle 200.

The propulsion system 202 further includes a torque converter 214 mechanically coupled between the prime mover 204 and the transmission 208. The prime mover 204 includes an output shaft 216 mechanically coupled to the torque converter 214. During operation of the prime mover 204, the output shaft 216 may rotate at a variable or constant speed. In the present disclosure, the output shaft rotation speed may also be referred to as engine speed. The propulsion system 202 includes an engine speed sensor 218 configured to measure the rotational speed of the output shaft 216 and generate an engine speed signal indicative of the engine rotational speed.

The torque converter 214 includes an impeller or pump 220 which is mechanically coupled to the output shaft 216, and a turbine 222 which is mechanically coupled to the transmission 208. The torque converter 214 includes a converter output shaft 224 mechanically coupled to the turbine 222. The converter output shaft 224 is in turn mechanically coupled to the transmission 208. During operation of the propulsion system 202, the converter output shaft 224 may rotate. In the present disclosure, the turbine rotational speed may also be referred to as the turbine speed. The propulsion system 202 further includes a turbine speed sensor 226 configured to measure the turbine rotational speed and generate a turbine speed signal indicative of the turbine rotational speed. The turbine rotational speed may be equal or substantially similar to the transmission input speed.

In the depicted exemplary embodiment, the system controller 212 generates an output signal and sends a feed forward torque command to the actuator(s) 206. In response, the actuator(s) 206 regulate the prime mover 204 to adjust the prime mover output torque, thereby controlling the engine rotational speed. Therefore, the prime mover 204 can be controlled based upon the feed forward torque command received from the system controller 212.

In particular, the system controller 212 receives the engine speed signal from the engine speed sensor 218 and the turbine speed signal from the turbine speed sensor 226 and determines a torque converter K-factor based upon those signals. The system controller 212 calculates a speed ratio, SR, which is defined as:

$$SR = Wout/Win \quad (1)$$

Where SR is the speed ratio, Wout is the turbine speed and Win is the engine speed. Knowing the speed ratio, a K-factor may be determined which corresponds to the speed ratio. A K-factor is generally defined as:

$$K = \frac{Wout}{SR * \sqrt{Tin}} \quad (2)$$

Where K is the K-factor and Tin is the torque input to the torque converter. For any given torque converter, the K-factor may be empirically determined and then the relationship between the K-factor and the speed ratio, SR, may be stored in K-factor table storage 232, and plotted as is illustrated in FIG. 3.

Figure 3:
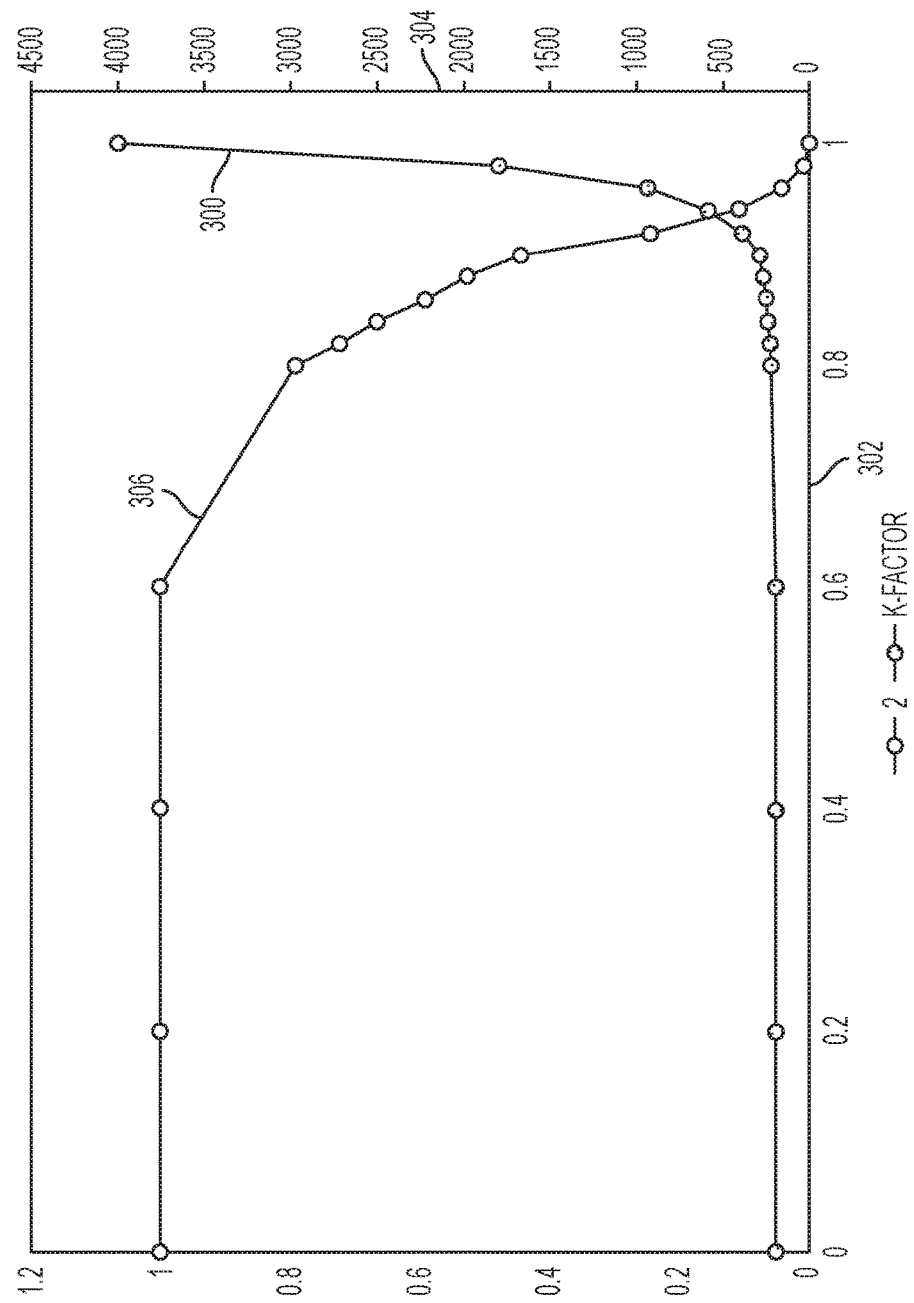
FIG. 3 is a graphical illustration of a torque converter K factor and a normalized torque converter K factor.

FIG. 3 illustrates a plot of K-factor 300 in relation to speed ratio. The speed ratio is illustrated in the horizontal axis 302 and the values of the K-factor 300 are illustrated by the vertical axis 304 on the right side of the plot. The system controller 212 is able to lookup the corresponding value for the K-factor using the K-factor table stored in K-factor table storage 232 and the speed ratio based upon the engine speed signal and the turbine speed signal as explained above.

As can be seen with reference to FIG. 3, the values for the K-factor may become very large. To make the K-factor more usable, the system controller 212 may normalize the values of the K-factor. One exemplary method of normalizing the K-factor values is to normalize it using a power factor of two. Where the normalized K-factor is equal to the square of the K-factor as a speed ratio of zero divided by the square of the K-factor at the actual speed ratio. In this manner, the K-factor may be normalized. An example of the K-factors normalized in this manner is illustrated by the plot line 306 in FIG. 3. While the exemplary embodiment described herein normalizes the K-factor as a square, any normalization method may be used without limitation and still practice the present invention.

The system controller 212 then generates a compensation torque to request from the engine based upon the desired engine speed and the normalized K-factor at any given speed ratio in accordance with the following equation:

$$Tin = \left(\frac{Win}{Kfactor}\right)^2 \quad (3)$$

Where Tin is the compensation torque, Win is the desired engine speed, and Kfactor is the normalized K-factor. In this manner, the torque output requested from and provided by the engine is compensated more closely in accordance with the specific performance characteristics of the torque converter. None of the conventional approaches compensated based upon the actual characteristics of the torque converter.

Figure 4:
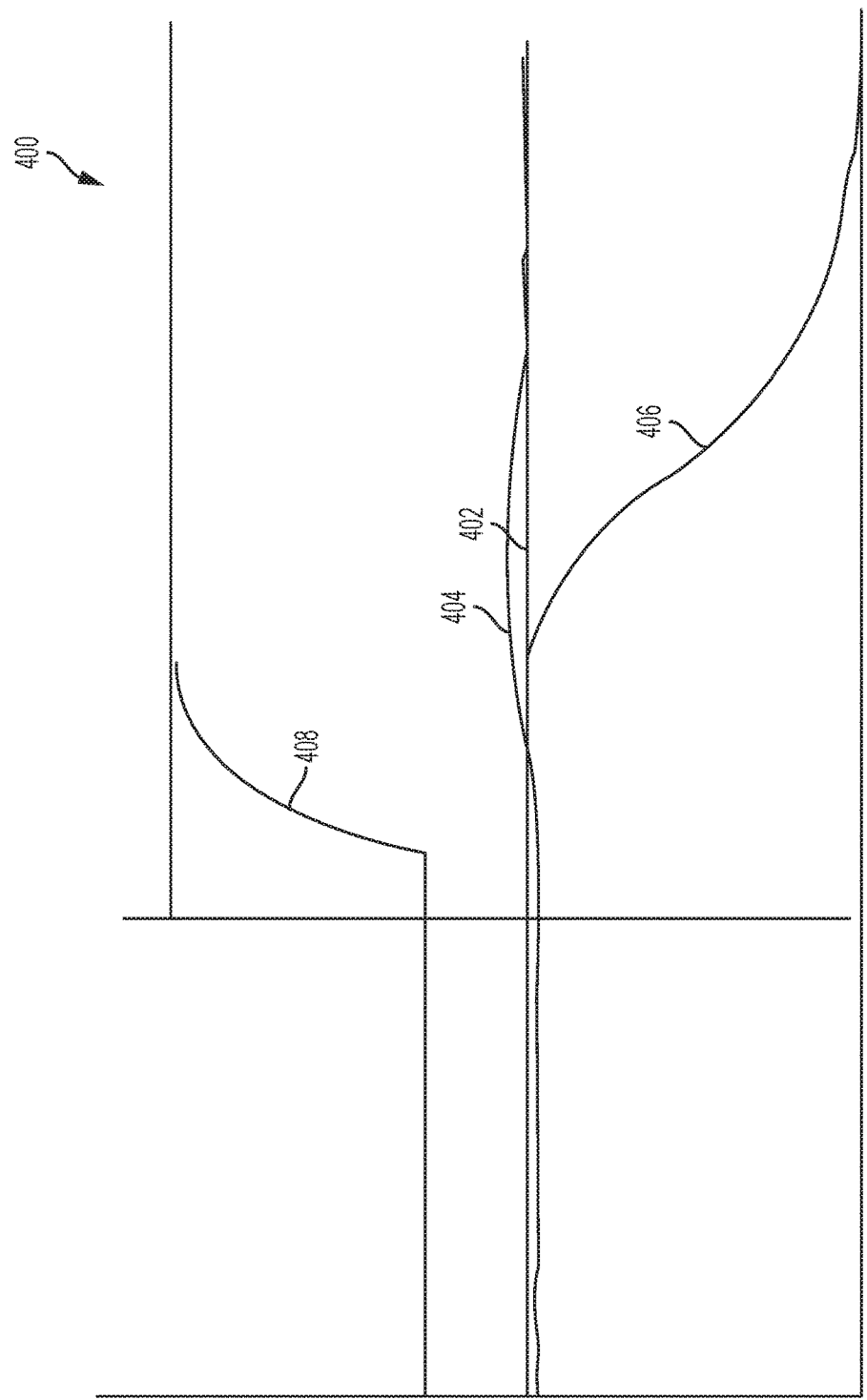
FIG. 4 is a graphical illustration of an engine speed control during a garage shift in accordance with an exemplary embodiment of the present disclosure.

FIG. 4 is a graphical illustration of an engine speed control 400 during a garage shift in accordance with an exemplary embodiment of the present disclosure. The desired engine speed is indicated at 402. In this instance, the desired engine speed 402 remains constant. The actual engine speed is indicated at 404 and the speed ratio for the torque converter is indicated at 406. As explained above, the controller 212 determines a K-factor and generates a torque compensation signal indicated at 408 based upon the determined K-factor. The torque request signal sent to the engine, as compensated by the torque compensation signal 408, results in an actual engine speed 404 that closely follows the desired engine speed 402.

Figure 5:
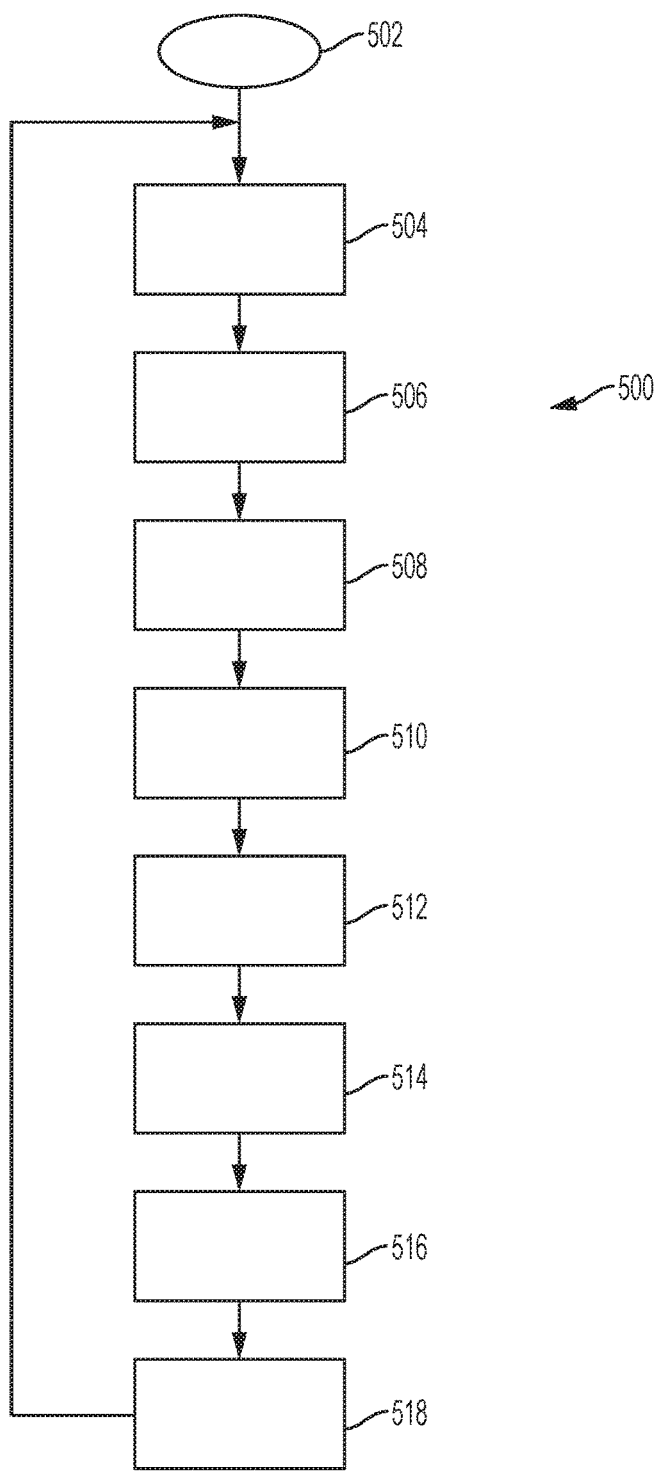
FIG. 5 is a flowchart illustrating a method in accordance with an exemplary embodiment of the present disclosure.

FIG. 5 is a flowchart illustrating a method 500 in accordance with an exemplary embodiment of the present disclosure. The method starts at step 502 and continues to step 504. In step 504, the method measures the engine speed and continues to step 506. In step 506, the method measures the turbine speed and continues to step 508. In step 508, the method calculates the speed ratio in accordance with Equation (1) and continues to step 510.

In step 510, the method refers to a table of empirically derived K-factor values corresponding to speed ratio and determines a K-factor corresponding to the speed ratio determined in step 508. The method continues to step 512 where the method normalizes the determined K-factor and continues to step 514. In step 514, the method determines a torque compensation signal based upon the normalized K-factor and a desired engine speed and continues to step 516.

In step 516, the method adjusts a torque request signal based upon the torque compensation signal and continues to step 518. In step 518, the method controls the engine in accordance with the adjusted torque request signal and returns to step 504.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for controlling vehicle engine speed during a garage shift, the method comprising:
   determining a K-factor of a torque converter based upon a determined speed ratio of the torque converter;
   controlling an engine speed based upon the determined K-factor; and
   normalizing the determined K-factor and wherein the controlling the engine speed is based upon the normalized K-factor, wherein the normalizing the determined K-factor comprises dividing the square of a K factor corresponding to a speed ratio of zero by the square of the determined K-factor corresponding to the determined speed ratio, and wherein the controlling the engine speed comprises:
   determining an engine torque compensation based upon the normalized K-factor; and
   controlling an engine torque based upon the determined engine torque compensation.

2. A system for controlling an engine speed during a garage shift for a vehicle including an engine, a transmission and a torque converter, the system comprising:
   a controller programmed to:
      determine a K-factor based upon a speed ratio of the torque converter; and
      control an engine speed based upon the determined K-factor; and
   an engine speed sensor that measures an engine speed and outputs an engine speed signal indicative of the measured engine speed; and
   a turbine speed sensor that measures a turbine speed of the torque converter and outputs a turbine speed signal indicative of the measured turbine speed, and wherein the controller is further programmed to:
      determine the speed ratio of the torque converter based upon the engine speed signal and the turbine speed signal and wherein the controller determines the K-factor based upon the determined speed ratio; and
      determine a normalized K-factor based upon the determined K-factor and wherein the controller determines an engine torque compensation based upon the normalized K-factor, wherein the controller determines the normalized K-factor based upon the square of a K-factor corresponding to a speed ratio of zero divided by the square of the determined K-factor corresponding to the determined speed ratio.

* * * * *